Dec. 1, 1970      J. J. CASSIDY      3,544,218
APPARATUS FOR TESTING SMOKE FROM A SPECIMEN OF MATERIAL
Filed June 5, 1967
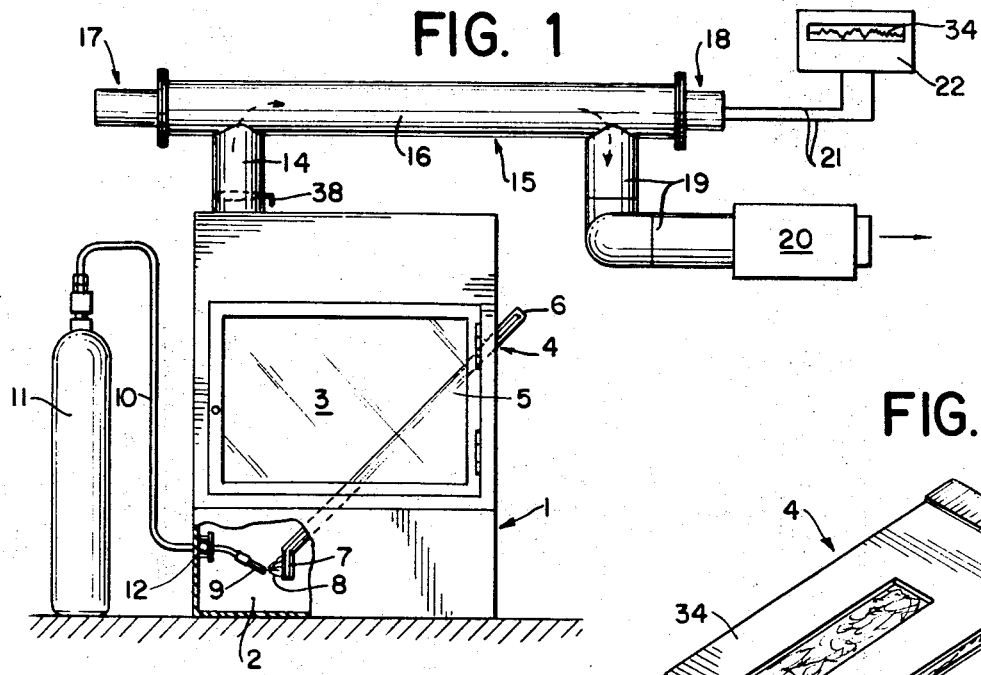
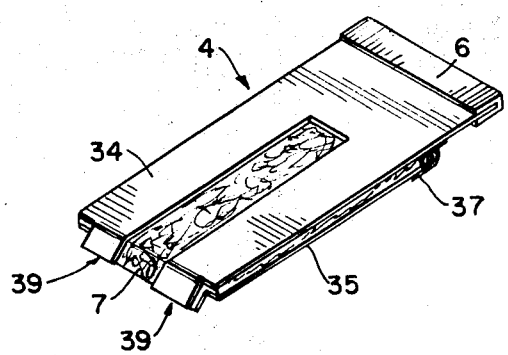
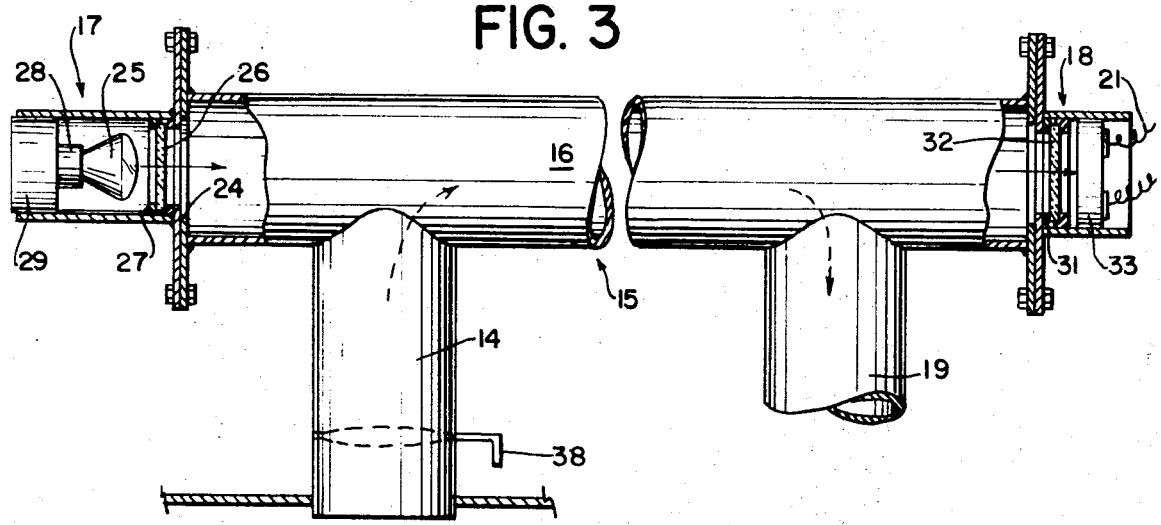

United States Patent Office

3,544,218
Patented Dec. 1, 1970

3,544,218
APPARATUS FOR TESTING SMOKE FROM A SPECIMEN OF MATERIAL
James J. Cassidy, Scotch Plains, N.J., assignor to M & T Chemicals Inc., New York, N.Y., a corporation of Delaware
Filed June 5, 1967, Ser. No. 643,595
Int. Cl. G01j *3/30;* G01n *21/12, 1/00*
U.S. Cl. 356—36        1 Claim

ABSTRACT OF THE DISCLOSURE

This disclosure relates to an apparatus for testing the smoke generated by the burning of a specimen of material by measuring under controlled conditions the light transmitted through the smoke. Smoke is generated in a burning chamber and caused to flow from the chamber through an elongated enclosure in which light is emitted and the amount of light transmitted through the smoke in the enclosure is measured.

BACKGROUND OF THE INVENTION

Proper determination and analysis of the burning characteristics of a material requires obtaining test data relating to the gaseous products of combustion or smoke produced by the burning of the material. Smoke includes opaque and light absorbing components thus permitting its detection by the observation and measurement of its light absorbing character. Attempts have been made to utilize smoke detecting techniques to test smoke but none of these attempts has produced an accurate and inexpensive apparatus for obtaining adequate smoke data. The known apparatus of this type fails to provide data upon which proper quantitative and qualitative analysis and comparison with other materials can be made. Such apparatus does not include proper smoke collection and delivery to a testing station such that a reliable and controlled test can be performed.

Other known apparatus for testing smoke have included filtering the smoke and then measuring, weighing and analyzing the precipitate. These filtering tests have the drawback of being unable to test those components of smoke which pass through and are not collected by the filter. Prior smoke testing apparatus have not been able to successfully satisfy the need for providing accurate and inexpensive determination of the smoke characteristics of materials.

SUMMARY OF THE INVENTION

The apparatus of the present invention includes a smoke testing device adapted to be connected to the specimen burning chamber of equipment used to burn specimens under controlled conditions. The smoke testing device provides for the measurement of the opaqueness and light absorption characteristics of smoke as it is exhausted from the burning chamber.

Broadly, the apparatus of the present invention comprises a smoke testing device adapted for attachment to an exhaust opening of a specimen burning chamber. The testing device functions with the burning chamber to permit the controlled flow of the smoke to pass into and out of a testing enclosure having a light producing source emitting light through the smoke-containing enclosure and a light sensitive means spaced from the light source for receiving emitted light passing through the smoke. The amount of light received is measured and read as the smoke passes into and out of the enclosure providing a reading from which the smoke characteristics of the specimen may be determined.

It is a feature of the invention that it provides an inexpensive, easy-to-use apparatus for accurately testing the smoke produced by the burning of a specimen of material.

It is a further feature that the smoke may be controllably exhausted from the burning chamber over a period of time and that variations in the amounts of light absorbed during this period measured and read to determine the relationship between time and amounts of light received. Specimens of materials may be compared with one another where the specimen sizes, chamber volume, rate of exhaust and light source are held constant.

BRIEF DESCRIPTION OF THE DRAWING

In the drawing FIG. 1 is a front elevation view of a specimen burning apparatus with a smoke testing device positioned above and connected to the apparatus; FIG. 2 is a perspective view of a specimen holder, and FIG. 3 is a partial enlarged view of the smoke testing device.

DESCRIPTION OF THE PREFERRED EMBODIMENTS

In the drawings, the specimen burning apparatus 1 includes a box-shaped burning chamber 2 in which the specimen is burned and the smoke generated is contained. The volume of the chamber is selected in relationship to the size of the specimens to be burned to control the density of the smoke to be tested. It is desired that the density of the smoke be such that significant amounts of light can pass through it. A hinged window 3 provides access to and observation of the chamber. A specimen holder 4 is inserted through slot 5 in the side of chamber 2 where it is supported in a diagonal position by handle 6. Additional specimen holder supports may be used, the holder being preferably positioned so that the ignition flame 8 from gas burner nozzle 9 is sufficiently close to the bent edge of specimen 7 (see FIG. 2) to permit the flame readily to raise the edge of the specimen to its kindling point. The smoke of any material specimen may be tested by my apparatus provided it is capable of burning and generating measurable amounts of smoke.

Nozzle 9 is supplied through gas line 10 which is connected to gas supply bottle 11 containing a suitable gas for igniting and, where desirable, for sustaining or accelerating the rate of burning of the specimen. Gas flow to the nozzle is controlled by operation of valve 12, the amount of flame and heat required varying with the type of material being tested. Ignition flame 8 may be extinguished after the specimen starts to burn or may continue to be burned to sustain or accelerate the burning of the specimen.

Smoke collected in chamber 2 is exhausted through chamber exhaust duct 14 into smoke testing device 15 which includes smoke testing conduit 16 having an electric light unit 17 at one of its ends, a photoelectric cell unit 18 at the other end, the conduit and the end units forming a smoke testing enclosure. After the smoke has been tested it flows out the conduit through conduit exhaust duct 19. The flow path of the smoke is shown by arrows on the drawing. The smoke generated and collected in the chamber 2 rises through outlet duct 14 into smoke testing device 15 where it passes into and pervades throughout the testing enclosure, its pervasion throughout the end units being prevented by glass plates 26 and 32. Exhaust duct 19 has exhaust blower 20 positioned in it for inducing the flow of smoke out of chamber 2 through conduit 16 and out to the atmosphere. A damper 38 is positioned in duct 14 to provide means for controlling the flow of smoke to the testing device. If desired, damper 38 may be held closed until part or all of the specimen has been consumed. The smoke collected in the chamber can then be permitted controllably to flow out by regulating the damper and the operation of blower 20.

Turning to FIG. 3, it is seen that testing conduit 16 has ring-shaped flanges welded at its ends to which are bolted electric light unit 17 and the photoelectric cell unit 18. Unit 17 includes a flanged housing 23 having an opening 24 to permit light from electric light bulb 25 to shine into and along the longitudinal axis of the testing conduit. A glass plate 26 suitably mounted in gaskets 27 is positioned between bulb 25 and opening 24 to prevent smoke from flowing into the light unit. Bulb 25 is inserted in socket 28 and powered by 12 volt battery 29. The amount of light produced by the bulb is preferably a substantially constant value for each test or group of tests and therefore a constant power source such as a battery is preferred; however, any readily measurable and controllable power source may be used.

At the other end of conduit 16, photoelectric cell unit 18 includes a housing 31 and a glass plate 32 to prevent the flow of smoke into the housing, while permitting light being transmitted through the smoke in conduit 16 to reach photoelectric cell 33. Glass plates 26 and 32 prevent smoke in the testing enclosure from flowing further into the end units; however, the use of plates is not required for acceptable operation of the testing device since the volume of testing conduit 16 is substantially greater than the volumes of the end units and therefore the small loss of smoke to the end units does not substantially effect the smoke density in the testing conduit between the bulb 25 and the photoelectric cell 33.

Light transmitted to photoelectric cell 33 operates by generating a voltage varying with the intensity and amount of flight reaching the surface of the cell. The voltage is transmitted by wires 21 to a conventional graph recorder 22 for recording on graph paper the relationship between time and voltages produced as successive portions of the smoke pass through the conduit. Other voltage measuring devices may be used and the readings recorded by a person operating the testing apparatus. Alternatively, a photoelectric cell may be used in which the amounts of light received by the cell vary the electric resistance of the cell. Variations in current flowing through the resistor are measured during the test runs. It is contemplated that any photo-sensitive device or material, such as photographic film, may be used to measure the light passing through the smoke. Testing conduit 16 preferably has a length substantially longer than its diameter thus providing for a direction of flow of the smoke substantially parallel to the longitudinal axis of the testing conduit. The inlet and outlet of the testing conduit may be positioned at various places in the conduit provided they are spaced apart a sufficient distance to permit adequate flow of the smoke into and out of the conduit.

Referring now to FIG. 2, the specimen holder includes upper plate 34 and a hinged jaw 35, the plate and jaw being urged together by coiled spring 37 to hold specimen 7. Both the plate and the jaw have corresponding rectangular cut-aways to expose a portion of the specimen for burning and both have bent edges 39 to position the lower edge of the specimen in a substantially vertical position for ignition by gas flame 8. Where rigid specimens are used, the specimen may be fabricated to fit in the holder or a holder without bent edges 39 may be used.

In the operation of the apparatus of the invention, jaw 35 of the holder is opened against the urging of spring 37 and the rectangular specimen to be tested is inserted in the holder. Bulb 25 is illuminated, valve 12 is opened and the gas escaping from nozzle 9 is lit. The loaded specimen holder 4 is placed into the chamber and as the edge of the specimen reaches its kindling point it commences to burn and to generate smoke.

The light from bulb 25 shines along conduit 16 reaching photoelectric cell 33 and producing a voltage. This voltage reading is constant until smoke damper 38 is opened allowing smoke to flow into testing conduit 16.

The voltage produced by the cell is lowered by the absorption of light by smoke in the conduit. The rate of flow of smoke through duct 14 into conduit 16 and the flow of the smoke out of the conduit through exhaust duct 19 is controlled by the operation of blower 20 and damper 38. The variations in voltage readings are recorded by recorder 22 which plots voltage and time. The curve of voltage against time provides a useful measure of the smoke characteristic of the specimen burned.

The volume of the smoke testing enclosure may vary but it is preferred that the enclosure have a volume smaller than the amount of smoke generated in the chamber so that the smoke generated will continue to pass through the conduit for a period of time permitting readings to be measured and recorded for a plurality of portions of the smoke. The variations in readings of successive portions of smoke provide a smoke characteristic for the specimen burned.

I claim:

1. In apparatus for measuring the burning characteristics of a plurality of different specimens by deliberately burning individual ones of the specimens to be tested and measuring the smoke emanating therefrom, and having a sealed burning chamber for burning a specimen therein, an exhaust opening in said sealed burning chamber, and a smoke measuring unit in flow communication with said exhaust opening for measuring the character and the quantity of smoke emanating from a specimen being tested, the combination which comprises a specimen holder disposed in said sealed burning chamber for holding the individual ones of the specimens to be tested, ignition means disposed adjacent said holder for igniting the specimens to be tested, and in which said smoke measuring unit includes an elongated smoke measuring enclosure having an inlet in flow communication with said exhaust opening and an outlet at the end thereof opposite said inlet, light emitting means disposed in said enclosure for emiting measurable amounts of light, a photoresistive cell having a variable resistance disposed in said elongated smoke measuring enclosure and spaced from said light emitting means for measuring light passing from said light emitting means and through smoke contained in said elongated smoke measuring enclosure, and with said photo-resistive cell having a resistance which varies with the amount of light received by said photo-resistive cell, a recorder connected to said photo-resistive for recording the variation in the resistance of the said photo-resistive, and exhaust means in flow communication with said outlet to maintain a flow of smoke emanating from said specimen being tested through said smoke measuring enclosure.

References Cited

UNITED STATES PATENTS

| 1,176,199 | 3/1916 | Burrell | 73—190 X |
|---|---|---|---|
| 1,829,001 | 10/1931 | Geromanos | 356—87 |
| 1,969,626 | 8/1934 | Simon et al. | 356—207 |
| 2,624,012 | 12/1952 | English et al. | 356—207 X |
| 2,706,928 | 4/1955 | Lee et al. | 356—87 |
| 3,204,449 | 9/1965 | Fordyce | 356—207 X |
| 3,207,026 | 9/1965 | Curchill et al. | 356—207 X |
| 3,376,425 | 4/1968 | Kraus et al. | 356—207 X |

RONALD L. WIBERT, Primary Examiner

W. A. SKLAR, Assistant Examiner

U.S. Cl. X.R.

73—190; 250—218; 356—87, 207